United States Patent

[11] 3,617,731

[72] Inventor: Jacques Fleury, Paris, France
[21] Appl. No.: 801,285
[22] Filed: Feb. 24, 1969
[45] Patented: Nov. 2, 1971
[73] Assignee: Societe Anonyme Automobiles Citroen, Paris, France
[32] Priority: Feb. 28, 1968
[33] France
[31] 3471

[54] ADJUSTABLE LIGHTING EQUIPMENT FOR ROAD VEHICLE
4 Claims, 4 Drawing Figs.

[52] U.S. Cl. ................................................ 240/8.25, 240/41.62, 240/61.1, 240/62.3
[51] Int. Cl. .................................................... B60q 1/12
[50] Field of Search .......................................... 240/8.25, 41.62, 41.6, 7.1, 62.3

[56] References Cited
UNITED STATES PATENTS

| 982,803 | 1/1911 | Dunning | 240/8.25 |
| 1,409,661 | 3/1922 | Brown et al. | 240/62.2 |
| 1,524,443 | 3/1924 | McVey et al. | 240/8.25 |
| 1,595,879 | 8/1926 | Schjotz | 240/41.6 |
| 3,316,397 | 4/1967 | Yssel | 240/7.1 |
| 3,370,162 | 2/1968 | Henry-Biabaud | 240/7.1 |
| 3,402,287 | 9/1968 | Hindman | 240/7.1 |

Primary Examiner—Samuel S. Matthews
Assistant Examiner—Joseph F. Peters, Jr.
Attorney—Arnold Robinson ABSTRACT: A road vehicle has head lamps pivotally mounted to illuminate the road round a curve as the vehicle moves into the curve. The lamps are also pivotal about horizontal axes to compensate for relative height of the vehicle structure at the front and the rear and also to compensate for roll. In a modification a device sensitive to acceleration or deceleration is also effective to maintain the lamp beams in a preset horizontal plane irrespective of the acceleration or deceleration.

3,617,731

ADJUSTABLE LIGHTING EQUIPMENT FOR ROAD VEHICLE

BACKGROUND OF THE INVENTION

1. Field of the Invention

This invention relates to road vehicle lighting systems.

2. Description of the Prior Art

Adjustment of the throw of headlamps on a motor vehicle is made, of course, in relation to the surface on which the vehicle is standing, in other words in relation to the ground. This throw, which should remain constant in relation to the surface, corresponds, in relation to the vehicle, to an angle which varies according to the loading on the front and rear wheel assemblies. Should there be any alteration in static load, this can be compensated by adjustment carried out as soon as loading is complete, before taking to the road. The same obviously cannot apply to changes in dynamic longitudinal loading, arising more particularly from the acceleration and deceleration of the vehicle or from irregularities in the road surface.

In French Pat. No. 1,407,221 and the first addition thereto, No. 87,233, there is described a device for automatic adjustment of the throw of the headlamps on a motor vehicle, irrespective of changes in the loads supported by the wheel assemblies of the vehicle, whether these were static loads or dynamic longitudinal loads.

One example of that device specifically described in the first patent of addition comprises, in conjunction with lamps mounted to pivot with respect to the chassis, about a substantially horizontal axis extending transversely of the vehicle, three piston-and-cylinder assemblies in which one member, that is to say the cylinder or the piston, is fixed to the chassis of the vehicle and the other is movable, the movable member of one of the assemblies being connected to the lamps so as to cause these to pivot, while the movable members of the other two assemblies are connected to members responsive to changes in level, relative to the ground, of the front and rear respectively of the vehicle, the three cylinders intercommunicating in such a way as to keep the throw of the lamps constant, irrespective of the acceleration and deceleration of the vehicle.

When the two arms supporting the front or the rear wheels are joined together by an antiroll bar, the member responsive to changes in level of that part of the vehicle which is adjacent to the wheels concerned may consist of an armed keyed to the said bar at an intermediate point in its length.

Again, when a motor vehicle is travelling at low speed, using regulation-type pass lamps, the lighting is sufficiently spread to give an adequately wide field of vision. When, on the other hand, it is travelling with its main or head lamps on, whether these be the normal headlamps or additional long-throw projectors giving correct illumination for high-speed driving on the straight, the lighting is far more concentrated, so as to carry a long way, and is then often inadequate on bends.

Vehicles have been proposed in which the lamps are mounted to pivot in relation to the car body and are linked to the steering so as to pivot at the same time and in the same direction as the wheels.

In most of these vehicles with pivotal lamps, the pivot axis is vertical. On bends, therefore, the pivot itself, being fixed to the car body, sways together with the body as it rolls under centrifugal force. The result is that the light beams are raised angularly above the horizontal plane.

To offset this raising of the beams, the pivot pin of each of the pivotal lamps may be tilted in a fore-and-aft longitudinal plane in relation to the chassis. This longitudinal tilting of the axis of the lamp lowers the light beam during a change of direction in steering. The angle through which it is lowered by this longitudinal tilt, however, is substantially a parabolic function of the pivot angle of the lamp. Consequently, if the pivot axes of the lamps be tilted longitudinally by a fixed angle to offset the raising due to rolling, in a turn that gives rise to a particular centrifugal force, that is to say for a given pivot angle of the lamp and a given speed, there will be over-compensation if the same turn be taken at reduced speed or undercompensation if it be taken at a higher speed. Again, 151 if compensation is obtained for a given angle or roll and a given pivot angle of the lamp, it will no longer be correct for a different pivot angle, if the angle of roll remains the same.

In their copending patent application filed under the title "Improved lighting equipment for road vehicles," the present applicants describe a vehicle with pivotal lamps in which the beams from the lamps can, on the contrary, be maintained at the proper level, that is to say substantially horizontal, when a bend is being negotiated, whatever be the speed of the vehicle and the radius of the bend.

In one example specifically described in that copending patent application, the vehicle has a system of headlamps mounted to pivot about an axis than can be tilted in a longitudinal vertical plane, with means whereby these lamps can be linked to a part of the steering system so as to cause them to pivot according to the change of direction of the wheels, as well as two piston-and-cylinder assemblies, one of which varies the tilt of the pivot axes of the lamps, while the other is controlled by a member responsive to the rolling of the vehicle, the two cylinders intercommunicating so that the said tilt varies in proportion to the roll. The device as a whole may be supplemented by a further piston-and-cylinder assembly, the cylinder of which is in communication with the two previous assemblies, this assembly coming into action, when steering force is applied to the wheels, to an extent governed by the speed of the vehicle.

The object of the present invention is to provide a vehicle in which the lamps pivot in synchronism with the steering and in which the pivot axes of these lamps are tilted both in relation to roll and to the acceleration and deceleration or to any variation in the longitudinal dynamic loading.

SUMMARY OF THE INVENTION

According to the present invention there is provided in a road vehicle a vehicle structure, two pairs of road wheels, a steering system operative to orientate one said pair of road wheels, a plurality of lamps each mounted to pivot about a respective axis lying in a substantially vertical plane extending longitudinally of the vehicle and also to pivot about a substantially horizontal axis extending transversely of the vehicle, means linking the steering system to each lamp whereby steering system adjustments cause related pivotal movement of the lamps about the said vertical axes, at least three sets of relatively movable members, each said set including a first said member, and a second said member, one said member of each set being secured to the vehicle structure and the other said member of each set being movable, and said movable member of one of the sets being connected to the lamps to cause movement of the latter about the horizontal axes, devices responsive to changes in level relative to the ground of the front and rear of the vehicle structure, said movable members of the two sets of relatively movable members being connected to said level responsive devices, fourth set of relatively movable members, a device responsive to roll of the vehicle and arranged to control the relative positions of the relatively movable members of the fourth set, and means providing interconnection of the four said sets so that, in relation to the vehicle structure, the optical axes of the lamps are tilted forward when the vehicle rolls and forward tilting is also effected when the rear of the vehicle falls relatively to the front thereof and the optical axes of the lamps are tilted rearwardly when the rear of the vehicle rises relatively to the front thereof.

Figure 1:
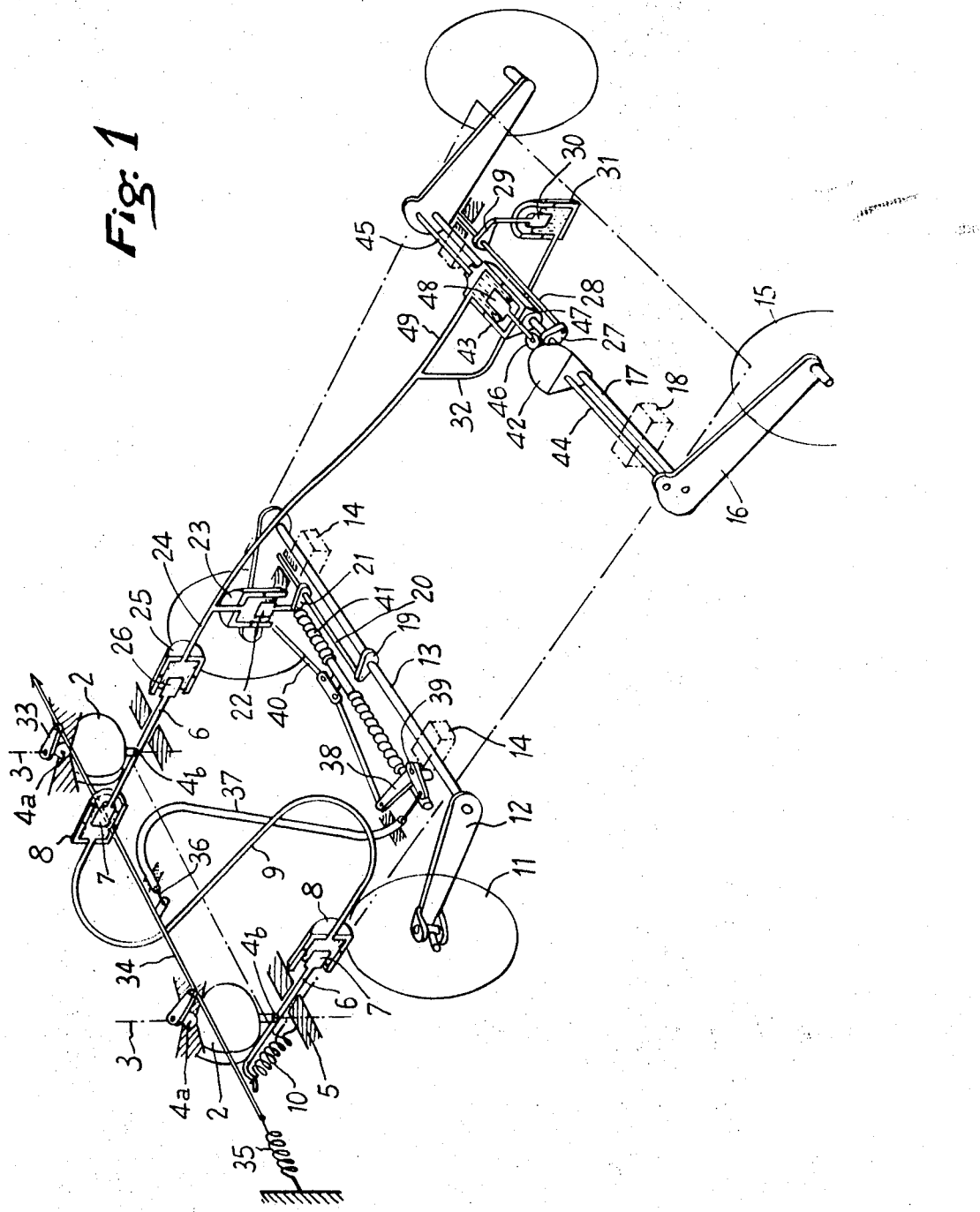
FIG. 1 is a perspective view of a vehicle incorporating a lighting system in accordance with the invention.

Referring now to the drawings and in particular to FIG. 1 the vehicle has two lamps 2. Each of these is fixed to a spindle 3, extending in a substantially vertical longitudinal plane at the same time in an axial plane of the lamp, substantially at right angles to its optical axis. The top of the spindle 3 is mounted by a ball-and-socket joint, 4a, on a part of the frame or bodywork 5 of the vehicle. The bottom end of the spindle 3 is connected by a ball joint 4b to a short rod 6, which is slidable, in relation to the chassis or bodywork, parallel to the fore-and-aft line of the vehicle.

Each of the rods 6 is connected at one end, the front end in the case of one of the lamps and the rear end in the case of the other, to a piston 7, slidable in cylinder, 8, filled with liquid. The two cylinders 8 intercommunicate through a pipe 9, so that the rods 6 always move in the same direction and through the same distance and thus the pivot axes 3 remain parallel. A restoring spring 10, connects one of the rods 6 to the frame, chassis, or bodywork 5, its action being to move the rod in the direction in which its piston is driven into the corresponding cylinder.

The front wheels 11 of the vehicle are mounted on the ends of arms 12, fixed to, and fast for rotation with an antiroll torsion bar 13, which is free to turn in brackets 14, carried by the frame or chassis 5.

Similarly, the rear wheels 15 are mounted on the ends of arms 16, fixed to, and fast for rotation with an antiroll torsion bar 17, which is free to turn in brackets 18 carried by the frame or chassis 5.

Keyed to the midportion of the anti-roll bar 13 is an arm 19, to the free end of which is fixed one end of a resilient bar 20, the other end of which is keyed to the chassis 5.

An arm 21 keyed to the bar 20 is connected to a piston 22, which slides in a cylinder 23, filled with liquid. This cylinder 23 communicates through a pipe 24 with a second cylinder 25, the piston 26 in which is connected to one of the rods 6.

It will thus be apparent that when the loading on the front of the vehicle is increased, for example, the torsion bar 13 turns in its brackets 14 and carries with it the arm 19, which in turn causes the resilient bar 20, and hence also the arm 21, to turn. The piston 22 is driven inwardly in its cylinder 23, causing a piston 26 to move outwards from its cylinder 25, carrying with it the rod 6 to which it is connected, and thereby varying the tilt or inclination of the spindle 3 connected to that rod. The linkage is such that the optical axis of the lamp 2 under consideration is raised. The two rods 6 being linked together by the cylinders 8 and pipe 9, the optical axis of the second lamp is likewise raised by the same amount.

The reverse of this action takes place when the loading on the front of the vehicle is reduced, the optical axes of the two lamps then being tilted forward.

Similarly, the antiroll bar 17 of the rear axle or suspension carries at its center an arm 27, to the free end of which is fixed one end of a resilient bar 28, the other end of which is keyed to the chassis or bodywork 5. An arm 29 keyed to the bar 28 is connected to a piston 30, slidable in a cylinder 31, which is filled with liquid. Contrary, however, to the conditions which apply to the front of the vehicle, the mode of assembly is such that when the bar 17 turns in consequence of an increase in the loading on the rear of the vehicle, the piston 30 is moved outwards from its cylinder 31, which communicates through the pipe 32 with the pipe 24.

It will be apparent that an increase in the loading on the rear of the vehicle will result in the optical axes of the lamps 2 being tilted forward, while a reduction in loading will raise them.

The various resilient bars have the same characteristics and the cylinders 23 and 31 have the same volumetric capacity, so that equal variation in the static loads on the front and rear of the vehicle will make no difference to the position of the piston 26 and hence to the tilt of the lamps 2.

However, a variation in the dynamic longitudinal loading will be followed by a change in the tilt of the lamp. For example, should the vehicle accelerate, its front will rise and its rear will drop, so that the optical axes of the lamps 2 will be tilted forward in relation to the body of the vehicle. Conversely, should the vehicle be braked, the optical axes of the projectors or long distance lamps will be raised in relation to the body of the vehicle, their throw remaining the same at ground level in both cases.

A short rod 33, is keyed to each spindle 3, the free ends of both these rods being pivoted to a single rod 34, which is linked to the steering rod system and acted upon by a restoring spring 35. When a steering force is applied to the wheels 11, therefore, the spindles 3 will be turned in the same direction.

The method of linking the rod 34 to the steering rod system is immaterial, the rod may be connected, for instance, to the steering repeater lever, but should preferably be such that some conventional mechanism ensures that the pivot angle of the lamps 2 is larger than the angle through which the wheels are turned and that this pivot angle increases more rapidly at the commencement than at the end of the change of direction of the wheels.

In the example shown, the rod 34 is connected by a cable 36 slidable within a sheath 37 to a steering repeater lever 38. This lever 38, mounted so as to pivot about a pin 39 relatively to the chassis 5, is connected by conventional means, through a rod 40, to a steering rack 41.

A cam 42, and a cylinder 43, are mounted on the midportion of the rear torsion bar 17, about which they are free to swing. This cam and cylinder are connected to the adjacent arms 16 by rods 44 and 45 respectively. The cam 42 acts in conjunction with a cam follower in the form of a roller 46, which is carried on a rod 47 rigid with a piston 48. The latter slides within the cylinder 43, which communicates through a pipe 49 with the pipe 32.

The cam 42 is symmetrical in shape and the roller 46 lies at the point of symmetry of the cam in the absence of rolling. When the vehicle rolls, the roller 46 rolls on the cam and the piston 48 moves outwards from the cylinder 43, so that the piston 26 is drawn into the cylinder 25 and lamps 2 are tilted forward to an extent governed by the magnitude of the roll and determined by the shape of the cam 42, irrespective of the direction of the roll.

As will be evident from the foregoing description, the lamps 2 are pivot with the wheels 11, but their pivot axes 3 are tilted in a longitudinal vertical plane to an extent governed by the roll, so that a rise in the light beams is avoided.

It is also clear that the same assembly of piston 26 and cylinder 25 serves to vary the tilt of the pivot axes of the lamps 2, both in the case of acceleration and deceleration or any change in the longitudinal dynamic loading and in the case of rolling.

It is also possible to cause this same piston-and-cylinder assembly to be acted upon by the device that acts according to the speed of the vehicle when steering is applied to the wheels, as described in the copending patent application hereinbefore referred to.

Figure 2:
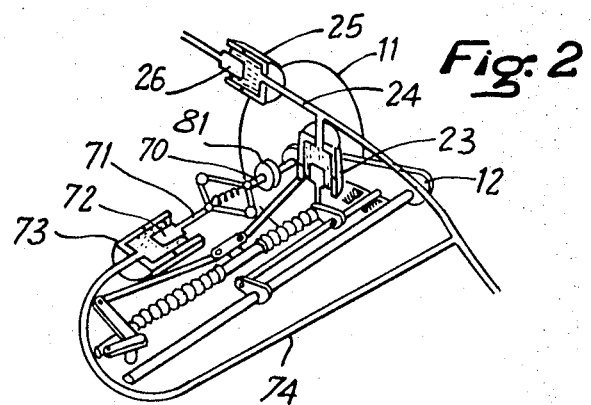
FIG. 2 is a perspective view of part of a modification of the system of FIG. 1.

Thus, in FIG. 2, the axle or other suspension system of the wheels 11, acting through a clutch 81, drives a shaft 70 of a centrifugal governor, the axially movable part 71 of which is connected to a piston 72. This piston slides in a cylinder 73, which is fixed to the chassis 5 and connected by a pipe 74 to the pipe 24.

The clutch 81 is operated by the steering movement of the wheels, so that the shaft 70 receives no drive when the wheels are directed straight ahead.

Figure 3:
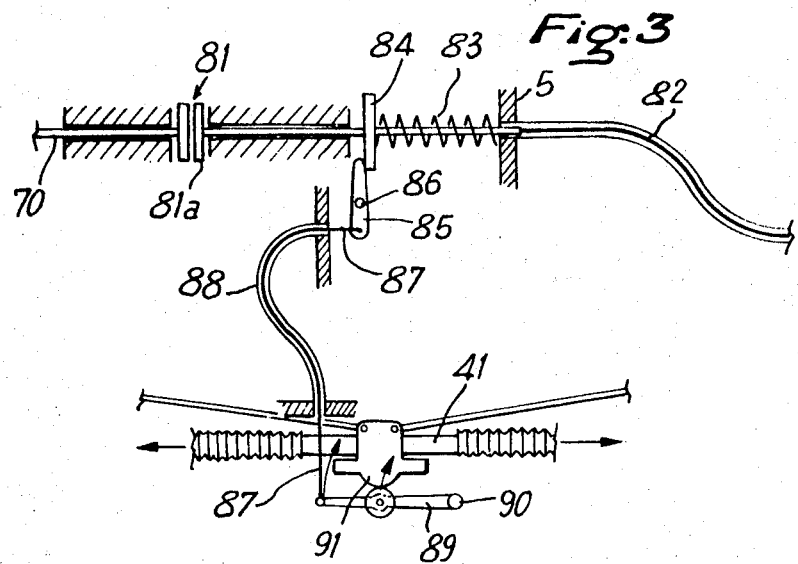
FIG. 3 shows a detail of the modification shown in FIG. 2.

In FIG. 3, a movable plate 81a of the clutch, which is connected by a cable 82 to the axle of the adjacent wheel 11, is biassed towards its "engaged" position by a spring 83, interposed between the frame 5 and the disc 84 rigidly connected to the plate 81a. One end of the lever 85, pivoted at 86 on the chassis, bears against this disc 84. The other end of the lever is connected by a cable 87, slidable in a sheath 88, to a lever 89, pivoted at 90 on the chassis and held by the spring 83 against a central boss 91, on the rack 41.

When the steering is centralized i.e. the vehicle is travelling straight ahead, the lever 85 holds the plate 81a in its inoperative position through the agency of the disc 84.

On a turn, on the other hand, the box 91 releases the lever 89, which turns and causes the plate 81a to be released, whereupon the shaft 70 is rotated.

Should the speed then be increased, the piston 72 moves in the cylinder 73 and the optical axes of the lamps 2 are tilted forward.

Figure 4:
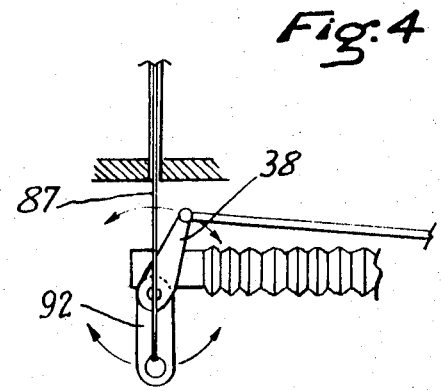
FIG. 4 shows a modification of the mechanism shown in FIG. 3.

In the modification shown in FIG. 4, the cable 87 is fixed to a lever 92, rigidly attached to the steering repeater lever 38, which releases the disc 84 by means of the cable 87 when the road wheels are swung to left or right. It should be emphasised that the invention should not be regarded as limited to the embodiments described and illustrated, but includes, on the contrary, all variants thereof.

I claim:

1. In a road vehicle a vehicle structure, two pairs of road wheels, a steering system operative to orientate one said pair of road wheels, a plurality of lamps each mounted to pivot about a respective axis lying in a substantially vertical plane extending longitudinally of the vehicle and also to pivot about a substantially horizontal axis extending transversely of the vehicle, means linking the steering system to each lamp whereby steering system adjustments cause related pivotal movement of the lamps about the said vertical axes, at least a first, second and third set of relatively movable members, each said set including a first said member, and a second said member, one said member of each set being secured to the vehicle structure and the other said member of each set being movable, and means for transmitting movement of said movable member of the first set to the lamps to cause movement of the latter about the horizontal axes, a pair of devices responsive to changes in level relative to the ground, of the respective front and rear of the vehicle structure, each one of the said movable members of the second and third set being connected to one of said level responsive devices, a fourth set of relatively movable members, a device responsive to roll of the vehicle and arranged to control the relative positions of the relatively movable members of the fourth set, and the four said sets so that, in relation to the vehicle structure the optical axes of the lamps are tilted forward when the vehicle rolls and forward tilting is also effected when the rear of the vehicle falls relatively to the front thereof and the optical axes of the lamps are tilted rearwardly when the rear of the vehicle rises relatively to interconnected means for transmitting movement of the movable members of said second, third and fourth sets to the movable member of the said first set to move the headlamps about the said horizontal axis whereby the optical axes of the lamps are tilted forward when the vehicle rolls and tilted forward when the rear of the vehicle falls relative to the front thereof and the optical axes of the lamps are tilted rearwardly when the rear of the vehicle rises relative to the front thereof.

2. A road vehicle according to claim 1, comprising a fifth set of two relatively movable members, one member of the fifth set being secured to the vehicle while the other is movable, a device responsive to the speed of the vehicle, the movable member of the fifth set being operable by said speed-responsive device means for transmitting movement of said movable member of said fifth set to the said interconnecting means to tilt the optical axes of the lamps forward when the vehicle speed increases and rearwardly when the vehicle speed decreases.

3. A road vehicle according to claim 2, incorporating means whereby the fifth set is inactivated when the vehicle is driving straight ahead.

4. A road vehicle according to claim 1, wherein one member of each of said set of relatively movable members comprises a cylinder and the other member of each set comprises a piston slidable in the cylinder.

* * * * *